United States Patent
Miller et al.

(10) Patent No.: US 12,539,125 B2
(45) Date of Patent: Feb. 3, 2026

(54) SMART DRILL MACHINE WITH DATA MONITORING/SMART MEDICAL ELECTRIC DRIVE INSTRUMENT WITH DATA MONITORING

(71) Applicant: Aesculap AG, Tuttlingen (DE)

(72) Inventors: Simon Miller, Deißlingen (DE);
Jürgen Schneider, Tuttlingen (DE);
Andreas Kammerer, Triberg (DE);
Thomas-Erwin Kahler, Seitingen-Oberflacht (DE)

(73) Assignee: AESCULAP AG (DE)

( * ) Notice: Subject to any disclaimer, the term of this patent is extended or adjusted under 35 U.S.C. 154(b) by 511 days.

(21) Appl. No.: 17/915,849

(22) PCT Filed: Apr. 1, 2021

(86) PCT No.: PCT/EP2021/058724
§ 371 (c)(1),
(2) Date: Sep. 29, 2022

(87) PCT Pub. No.: WO2021/198473
PCT Pub. Date: Oct. 7, 2021

(65) Prior Publication Data
US 2023/0125252 A1    Apr. 27, 2023

(30) Foreign Application Priority Data
Apr. 1, 2020 (DE) .................. 10 2020 109 069.2

(51) Int. Cl.
*A61B 17/16* (2006.01)
*G01R 31/392* (2019.01)
(Continued)

(52) U.S. Cl.
CPC ........ *A61B 17/1628* (2013.01); *G01R 31/392* (2019.01); *H01M 10/4257* (2013.01);
(Continued)

(58) Field of Classification Search
CPC .... A61B 17/16; A61B 17/1628; H01M 10/42; H01M 10/4257; H01M 10/48;
(Continued)

(56) References Cited

U.S. PATENT DOCUMENTS

| 7,514,890 B2 | 4/2009 | Schneider et al. |
| 2006/0161212 A1 | 7/2006 | Rasch-Menges et al. |

(Continued)

FOREIGN PATENT DOCUMENTS

| DE | 10100795 A1 | 8/2002 |
| DE | 10337679 A1 | 3/2005 |

(Continued)

OTHER PUBLICATIONS

German Search Report for German Application No. 10 2020 109 069.2, dated Jan. 28, 2021, with partial translation, 10 pages.
(Continued)

*Primary Examiner* — Christopher J Beccia
(74) *Attorney, Agent, or Firm* — Buchanan Ingersoll & Rooney PC

(57) ABSTRACT

A battery device for a medical instrument for supplying electric energy to instrument-internal electric equipment, preferably an electric motor, having: an electronic controller which is integrally formed with the battery for actuating the entire instrument-internal electric equipment, preferably on the basis of actuation signals from an operator; a plurality of functions including a corresponding sensor system; and an integrated intelligence at least consisting of a protection circuit, a motor controller, and a wireless communication interface.

15 Claims, 5 Drawing Sheets

(51) Int. Cl.
  H01M 10/42 (2006.01)
  H01M 10/48 (2006.01)
  H02J 7/00 (2006.01)
  *A61B 17/00* (2006.01)

(52) U.S. Cl.
  CPC ......... H01M 10/486 (2013.01); H02J 7/0045 (2013.01); *A61B 2017/00221* (2013.01); *H01M 2010/4271* (2013.01); *H01M 2010/4278* (2013.01)

(58) Field of Classification Search
  CPC ........ H01M 10/486; H02J 7/00; H02J 7/0045; G01R 31/392
  See application file for complete search history.

(56) References Cited

U.S. PATENT DOCUMENTS

| | | |
|---|---|---|
| 2012/0116367 A1 | 5/2012 | Houser et al. |
| 2013/0169223 A1 | 7/2013 | Lee et al. |
| 2014/0052135 A1 | 2/2014 | Aman et al. |
| 2015/0201918 A1* | 7/2015 | Kumar ............... A61B 17/1626 606/104 |
| 2016/0310134 A1 | 10/2016 | Contini et al. |
| 2017/0007219 A1* | 1/2017 | Bucina ................... A61B 17/00 |
| 2017/0212995 A1* | 7/2017 | Ingmanson ............ G16H 40/20 |
| 2019/0261984 A1* | 8/2019 | Nelson ............. A61B 17/07207 |
| 2020/0038285 A1 | 2/2020 | Bauer |

FOREIGN PATENT DOCUMENTS

| | | |
|---|---|---|
| DE | 102004038415 A1 | 3/2006 |
| DE | 102014100918 A1 | 7/2015 |
| DE | 102017103941 A1 | 4/2018 |
| DE | 202018000439 U1 | 4/2018 |
| WO | 2006111773 A2 | 10/2006 |

OTHER PUBLICATIONS

International Search Report and Written Opinion for International Application No. PCT/EP2021/058724, dated Jul. 1, 2021, 9 pages.
Office Action (Communication pursuant to Article 94(3) (EPC) issued Dec. 5, 2024, by the European Patent Office in corresponding European Patent Application No. 21 716 723.8-1002 and an English translation. (14 pages).
English Translation of the Written Opinion for International Application No. PCT/EP2021/058724, dated Jul. 1, 2021, 7 pages.

* cited by examiner

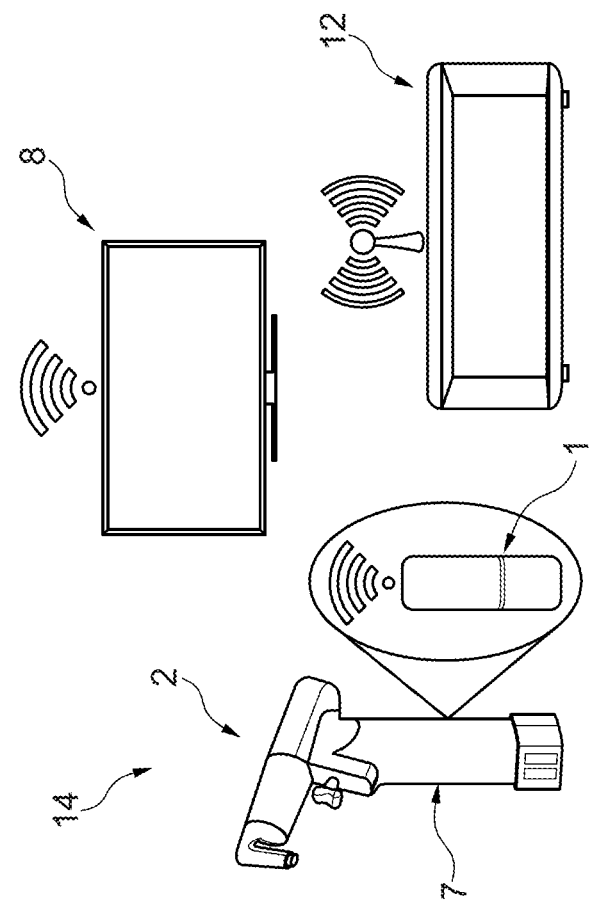
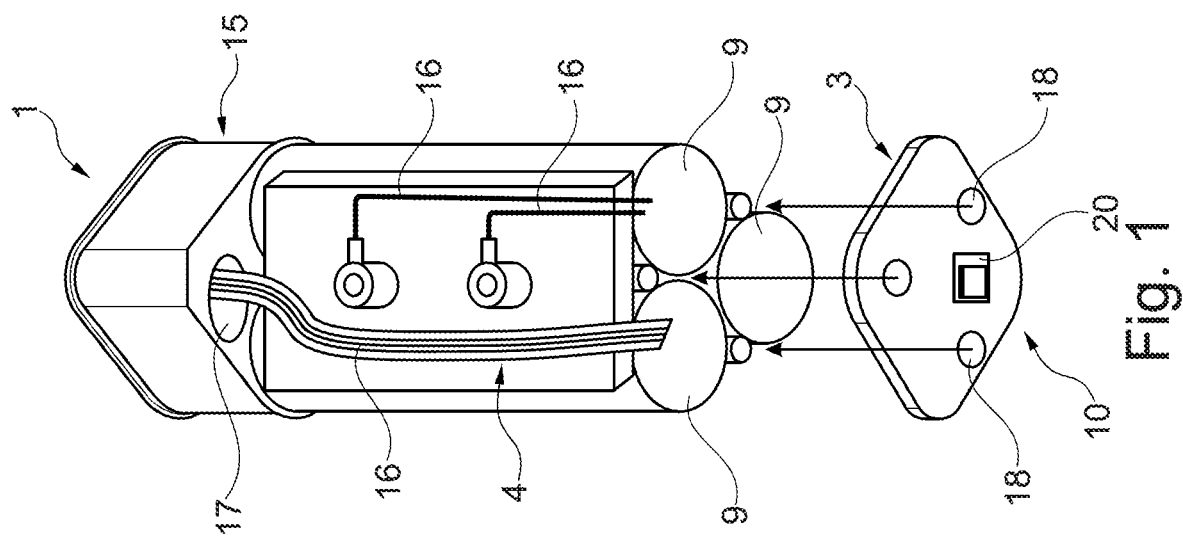

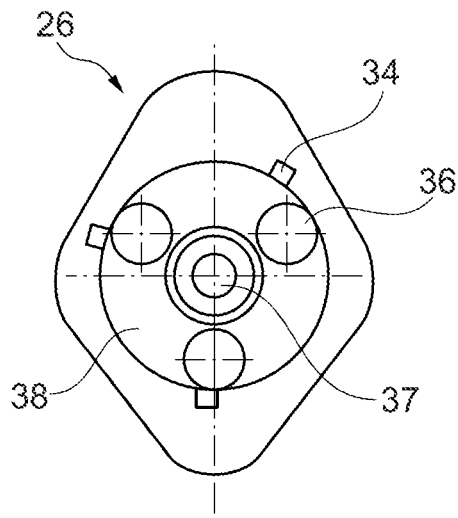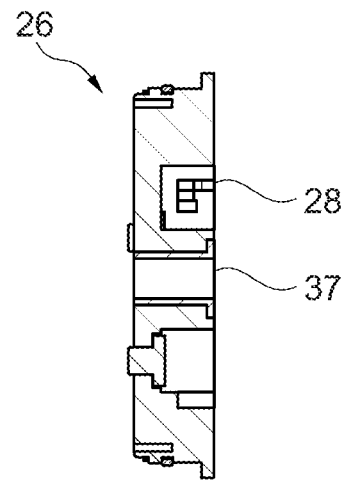
Fig. 6   Fig. 7
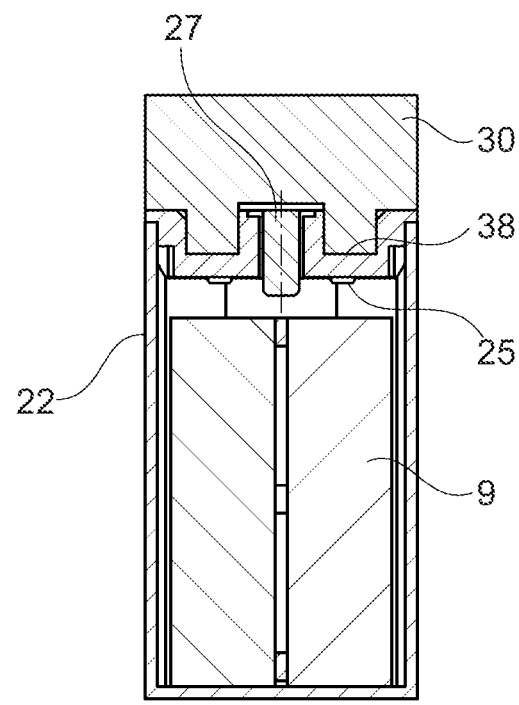
Fig. 8

SMART DRILL MACHINE WITH DATA MONITORING/SMART MEDICAL ELECTRIC DRIVE INSTRUMENT WITH DATA MONITORING

This application is a U.S. National Phase application of PCT International Application No. PCT/EP2021/058724, filed Apr. 1, 2021, which claims the benefit of DE 10 2020 109 069.2, filed Apr. 1, 2020, both of which are incorporated by reference herein.

TECHNICAL FIELD

The present disclosure relates to a smart accumulator for a medical electrical instrument/application part as well as to a medical treatment system or medical treatment device consisting of a medical instrument/application part, at least one accumulator or electrical energy storage, a charging station and a display device separate from the medical instrument.

BACKGROUND OF THE INVENTION

In medicine, in particular in surgery, medical instruments such as drills, grinders, and saws, but also other types of equipment such as pumps, life-support machines, and measuring devices are frequently used, which utilize a battery or an accumulator as a primary (mobile) energy source for operating the electrical equipment/gear/components of the respective instruments, in order to be independent of a stationary energy source such as the power grid. Such batteries/accumulators are usually configured as 'build-in' units, i.e., so-called battery blocks, which can be inserted into a correspondingly shaped battery housing/compartment in/on the instrument, which can be closed via a lid. In this way, sterility can be ensured, since the inserted battery/accumulator is hermetically sealed from the instrument environment.

It is important to be able to replace the accumulator, in particular if the instrument is to be subjected to a sterilization process after use, which could damage or destroy the inserted battery/accumulator. This means that the battery or respectively the accumulator is removed from the instrument housing before such a sterilization process and charged in a charging station during the sterilization process.

It should be noted at this point that medical electrical instruments or their functions have to be controlled/regulated in some form, for which corresponding control electronics are necessary. It must be taken into account that, despite the arrangement of such electronics, the sterilizability of the medical electrical instrument remains guaranteed without the electronics being damaged by this.

In the case of a medical electrical instrument for connection to a stationary power supply, for example, this can be implemented practically in a simple manner by integrating the electronics for the medical instrument into the power supply unit connected to the stationary power supply. However, this is not possible for an accumulator-powered instrument (without a stationary power supply unit). Therefore, in such cases, the respective electronics are integrated into the battery or the accumulator, respectively, and are consequently removed from the instrument together with the battery for a sterilization process.

In addition, the surgical instruments are designed for a wide range of applications. Here, there is a great danger for the patient if the accumulator of the instrument, in particular of the drill, becomes empty due to an increased energy demand. Replacement of the instrument is not intended and replacement of the accumulator takes time and is associated with the risk of losing sterility.

PRIOR ART

For example, WO 2006/111773 A1 discloses an accumulator-operated surgical instrument of the hand instrument type in whose battery/accumulator, control electronics for driving/regulating an electric motor of the instrument are integrated. Furthermore, in the related field of DIY machine technology, there are electric machine tools such as drilling or screwing machines, to the respective handle part of which a battery block is docked for operating an electric motor. The battery can be equipped with smart functions such as voltage, current, temperature and/or charging-state detection means/sensors, the measured values of which can be transmitted to a control unit via a wireless communication device and can be displayed on a cell phone, for example. However, in such machine tools, the control of the machine-internal motor is usually built into the machine tool, since the accumulator can wear out comparatively quickly and therefore replacement costs have to be kept as low as possible. Incidentally, machine tools are not subjected to any sterilization process.

Furthermore, a system is needed that informs the surgical team in good time that the accumulator is running low. If this information were available early enough, a suitable non-critical moment could be selected to replace the accumulator with a new one. Since in the known prior art the accumulator and the electronics are located inside the application part or the medical instrument, there is no possibility to inform the user or operator about the status of the device via optical display.

From the prior art, displays of the remaining accumulator capacity and other operating parameters are known and are used in DIY equipment and other battery-powered devices. The electronic intelligence is located in the respective application part/medical instrument, which makes the sterilization process of the application part/medical instrument in the medical field difficult. In the known prior art, the charging state of the accumulator can only be read during charging at the charging station. If the accumulator is outside the charging station or even in the application part, this is an unknown variable. So far, such displays of the operating parameters are only known for wired devices.

BRIEF DESCRIPTION OF THE INVENTION

Based on this prior art, it is the object of the present disclosure to provide a smart accumulator for a medical, electrically operated instrument/application part, preferably of the hand-held instrument type, as well as a medical treatment system comprising such a medical instrument/application part, with which in particular the problems of sterilization can be reduced/eliminated.

This object is solved by a smart accumulator having the features of claim 1 and by a medical treatment system having the features of claim 10. Advantageous embodiments of the disclosure are thereby the subject matter of the dependent claims.

Accordingly, the present disclosure relates to a smart accumulator (smart accumulator block) for a medical, in particular surgical instrument/application part for the electrical power supply of an instrument-internal electric equipment, preferably of an electric motor, comprising accumulator/accumulator block-integral control electronics for driving the entire instrument-internal electric equipment, preferably in dependence on actuation signals from an operator, a plurality of smart functions including the associated sensor system, and an integrated intelligence at least consisting of a protection circuit, a motor regulation as well as a wireless communication interface.

In other words, the smart accumulator/smart accumulator block is integrally equipped on the one hand with control electronics in particular for driving the electric equipment/components, in particular the electric motor of the medical instrument/application part, and on the other hand with smart functions including the associated sensor system. Here, it is preferred to be able to transmit the corresponding measured values to a display device/external interface (with receiving device) via an accumulator/accumulator block-integrated data transmission device. This means that the battery/battery block or the accumulator/accumulator block for the medical instrument/application part preferably contains all control and smart functions for controlling and/or regulating as well as monitoring the electric equipment/components (for example electric motor) of/in the medical instrument and also the battery or the accumulator itself.

The control electronics attached/integrated to/in the smart accumulator/smart accumulator block has the advantage that the application part/medical instrument has a control-free drive unit. Furthermore, it is preferred if the control electronics is arranged on at least one printed circuit board which is fixed to/in the accumulator/accumulator block. Furthermore, it is preferred if the wireless communication interface is arranged on a first printed circuit board and the protection circuit is arranged on a second printed circuit board, wherein the first printed circuit board is preferably fixed at the foot end of the accumulator/accumulator block and the second printed circuit board is preferably arranged laterally in the longitudinal direction to the accumulator/accumulator block.

In addition, the accumulator/accumulator block can be formed from or respectively comprise several (bundled) power storage cells. On the side of the accumulator/accumulator block opposite the first printed circuit board, an accumulator head/housing is preferably arranged which houses the accumulator or the individual power storage cells. It is also preferred if the accumulator head has a cable receptacle or cable shaft for electrically connecting the poles of the accumulator/accumulator block or of the individual power storage cells to the first and/or second printed circuit board.

This is advantageous, since an operation team or user/operator is informed in time of a critical state of the smart functions, in particular of the accumulator-charging state, so that an accumulator/accumulator block can be inserted into the device or replaced early enough and at a favorable time.

Here, it is preferred if the smart functions include at least one of the following functions, for example
- the charging state,
- the temperature of the accumulator/accumulator block and/or of the medical instrument/application part,
- the rotational speed of the instrument motor,
- the current consumption of the electric equipment, preferably of the electric motor,
- the voltage,
- the output power of the instrument motor, and/or the
- activation detection to detect the installation state in the instrument or receiving compartment of the instrument/application part, and to activate the control electronics/electrical equipment from a power saving sleep mode.

This has the advantage that the external interface, which is preferably a monitor, can be used to display other aforementioned parameters in addition to the accumulator-charging state or to query them as required.

Furthermore, it is preferred if the medical instrument/application part has a handle part with a receiving compartment/shaft for actuating the medical instrument and the smart accumulator is provided and configured to be insertable and/or pluggable into the receiving compartment.

Furthermore, it is preferred if the smart accumulator/accumulator block has a data memory which is provided and configured to store a load history and/or to transmit this to a display device in order to determine and/or to detect a remaining service life of the respective accumulator and/or an operating behavior and/or occurring faults based on the transmitted data.

In other words, the smart accumulator/accumulator block can also be provided with a data memory in which the load history, such as the number of charge cycles and/or deep discharge states, etc., is stored, which can also be transmitted to the display unit, so that the transmitted data can be used, for example, to draw conclusions about the remaining service life of the respective accumulator. Thus, the displayed operating parameters provide information about the operating behavior and any errors. An overload of the medical instrument can therefore be checked during ongoing operation/application. A prognosis of the remaining runtime and residual accumulator charge makes the operation procedure plannable and more reliable. This also ensures greater safety for the patient.

This means that not only is the charging state available, but also a prognosis of how long the device can still be operated with this accumulator/accumulator block. This is advantageous, since, based on the stored load history or the stored data, the prognosis can be made as a function of the load and thus represents a reliable value. An unpredictable drop in the remaining service life can thus be prevented.

Specifically, smart-function specific/assigned sensors are integrated into the accumulator/accumulator block, the measured values of which are sent/transmitted to an integrated intelligence, preferably consisting of a protection circuit, a regulation of the electric equipment (e.g. motor regulation) and a wireless communication interface, so that the instrument/application part itself can remain completely free of integrated electronics. In other words, the intelligence is fully integrated in the accumulator/accumulator block. The wireless communication interface is therefore required, since the accumulator/accumulator block is fully enclosed in the application part/medical instrument during use and no visual indications can be projected to the outside for the user. This makes it possible to maintain sterility. The application part/medical instrument (itself) is completely free of integrated electronics and can therefore be easily sterilized via steam sterilization, for example, without damaging electronic components.

It is preferred if the wireless communication interface is integrated in a bottom side of the smart accumulator/accumulator block as an antenna for communication to the outside of the application part/medical instrument and is provided and configured to send data to be transmitted through a lid of the application part enclosing the inserted smart accumulator/accumulator block in the receiving compartment. It is preferred that all necessary operating data is exchanged between the medical instrument/application part, the charging device and the external interface, preferably electronic display, via the wireless communication path, wherein the current operating data as well as data from the history of the respective accumulator(s) are displayed.

In other words, the antenna representing the communication interface to the outside is located at the bottom of the accumulator/accumulator block and thus transmits through the lid to the remote station/external interface.

Furthermore, it is preferred if the wireless communication interface is a radio transmission according to the Bluetooth Low Energy standard in 2.4 GHz band.

Furthermore, it is preferred if the smart accumulator/accumulator block is provided and configured to communicate the type of the accumulator/accumulator block to a charging station when plugged in for setting an accumulator-specific charge curve, wherein the charging station is provided and configured to regulate charging of the accumulator/accumulator block. In other words, the smart accumulator may include an accumulator identifier for identifying the accumulator type, which may be read, for example, by a charging station, which then selects a accumulator-specific charge cycle (corresponding to an associated charge curve). In other words, the type of accumulator/accumulator block is communicated to the charging device by wire when it is plugged in. Based on this information, the charging device sets the correct charge curve for the accumulator type. The charging intelligence is entirely on the side of the charging device. This also takes over the charging regulation.

Furthermore, it is preferred if the integrated intelligence is provided and configured to recognize the direction of rotation, preferably of the electric motor, wherein the starting of the motor is effected by a key and the direction of rotation can be changed/reversed by simultaneously pressing and holding a second key. This has the advantage that no reverse button has to be pressed permanently. In other words, the direction of rotation of the motor or respectively of the tool attached to the instrument/application part is detected.

In addition, it is preferred if the smart accumulator/accumulator block is provided and configured to automatically set the accumulator-integral control electronics into the power-saving sleep mode upon removal from the receiving compartment. In other words, via detection that is activated when the accumulator is in the receiving compartment of the application part/medical instrument, the process or electronic equipment/components are woken up and are ready to communicate. As soon as the accumulator/accumulator block is removed from the machine or receiving compartment, the electronics or the process is put into the power-saving sleep mode/resting state in order to achieve the longest possible accumulator life.

Furthermore, it is preferred if the application part/medical instrument is made/manufactured from appropriate materials that allow complete sterilization and/or reprocessing of the application part/medical instrument. Thus, it is preferred if the material of the application part/medical instrument is titanium. In the present disclosure, the smart accumulator/accumulator block is always non-sterile and is placed in the receiving compartment of the application part/medical instrument. Via the lid, preferably made of plastic, which is again sterile, the smart accumulator/accumulator block is fixed and surrounded/enclosed. The material of the lid thus differs from that of the application part/medical instrument. This ensures the transmission of data.

Furthermore, the present disclosure relates to a medical instrument/application part of the hand-held instrument type, preferably surgical drilling/milling instrument, having a smart accumulator/accumulator block according to one of the preceding aspects.

Furthermore, the present disclosure relates to a medical treatment system comprising a medical instrument/application part according to the preceding aspect, an accumulator-charging device, and a display device.

Furthermore, the present disclosure relates to a modular smart accumulator/accumulator block for a medical instrument preferably according to one of the preceding aspects of the disclosure for electric power supply of instrument-internal electric equipment, preferably of an electric (instrument) motor comprising a device-terminal unit containing smart functions (according to the preceding definitions) and a accumulator pack module comprising accumulator-integral control electronics (battery management system), optionally a protection circuit, accumulator cells and optionally an antenna for data transfer (preferably via Bluetooth), wherein the device-terminal unit and the accumulator pack module are connected via a detachable mechanical-electrical (and electronic) coupling mechanism.

This modular smart accumulator may be claimed independently/separately to the current claim 1 or the preceding aspects of the disclosure. Furthermore, the following aspects may also be claimed independently/separately to the current set of claims.

In other words, an accumulator that is separable/detachable in itself is thus provided. That is, the accumulator pack module (which contains the accumulator cells as well as the battery management system/control system) can be separated from the device-terminal unit which contains the smart functions such as control electronics for the medical instrument (into which the accumulator is to be inserted) as well as data communication electronics, if applicable, and the two components can be maintained or replaced independently of each other. This has the advantage that if the accumulator cells wear out, only the accumulator pack module itself can be replaced, and the device-terminal unit (as a reusable assembly) with the smart functions it contains can be connected to a new accumulator pack module (as a disposable assembly). In this way, there is the possibility of performing an authorized battery construction service at the end of the life cycle. The modular smart accumulator also offers the advantage of easy, pluggable disassembly/assembly of the two assemblies, in particular when the detachable coupling mechanism has a screw or bayonet lock. Gluing or riveting is a preferred alternative or additional fastening option. Since the device-terminal unit is the more expensive component of the smart accumulator due to the smart functions, costs can be saved in this way if only the accumulator pack module is renewed and is connected to the original device-terminal unit.

In other words, it is preferred if the accumulator is a modular, platform-based secondary battery, which is configured to be detachable/can be detached from the applications/medical instrument through an authorization-releasable closure/coupling mechanism.

It is preferred if the accumulator pack module has cell holders, preferably three cell holders, which are provided and configured to hold the accumulator cells, preferably three accumulator cells, together in the form of a cell block by clipping the accumulator cells into recesses of the cell holders provided for this purpose.

It is advantageous if the device-terminal unit and the accumulator pack module are mechanically connectable to each other via a bayonet lock.

It is advantageous if the accumulator pack module has an interface module which is configured for mechanical and electrical/electronic connection to the device-terminal unit.

It is preferred if the interface module has contacting pins which are in electrical contact with the accumulator cells on one side and have contact surfaces on the other side which can be brought into contact with corresponding contacts on the device-terminal unit when this is mounted on the interface module so as to supply the device-terminal unit with voltage from the accumulator cells. It is also preferred if the interface module has a (centrally arranged) sleeve receptacle (center bore) for receiving a (contact) sleeve, which is provided and configured to provide an electrical/electronic connection between the accumulator pack module or its battery management system and, if applicable, an antenna and the device-terminal unit or its control electronics/smart functions.

It is advantageous if a data cable and/or a communication bus can be routed through the sleeve.

It is also advantageous if the data cable or the communication bus can be connected to the device-terminal unit via a plug connection.

It is alternatively preferred if the (contact) sleeve itself has axially offset contact portions and the plug connection on the side of the device-terminal unit has a jack connection which can be plugged into the sleeve or is plugged in when the device-terminal unit is mounted with the accumulator pack module in order to provide electrical contacts between the control electronics and the battery management system and possibly an antenna for data transfer when connecting the device-terminal unit and the accumulator pack module, preferably via the bayonet lock.

It is advantageous if the contacting pins have a respective wave spring washer on the side facing the device-terminal unit, which supports the force action of the contacting pin on the accumulator cells and/or the contacts on the device-terminal unit when closing the mechanical, preferably bayonet lock.

Preferably, the accumulator pack module is configured with the battery management system according to the aforementioned second printed circuit board, which is fixed, preferably screwed, in a battery management holder/printed circuit board holder, wherein the battery management holder/printed circuit board holder is insertable with a conductor rail/guide rail in the axial longitudinal direction into a conductor groove, which is provided on/in the cell holders.

It is preferred if the contacting pin is provided in a ring-shaped indentation of the interface module, wherein the indentation, when closed via the mechanical, preferably bayonet lock, is filled with a precise fit with a bottom side of the device-terminal unit, i.e. the side facing the accumulator pack module, so that the device-terminal unit can be supplied with a voltage supply.

It is advantageous if the jack plug has a plurality of planes/axial portions which come into contact with corresponding planes/axial portions in the (contact) sleeve and during the rotary movement when closing the mechanical, preferably bayonet lock these electrical connections are maintained.

In other words, it is advantageous if the modular smart accumulator is configured from a spacer/cell holder, a protective circuit, a jack connection, a bayonet lock and a lock mechanism. It is also advantageous here that the (smart) universal energy unit offers the option of adapting different cell variants in several applications in the future via an adapter. The spacer/cell holder is provided to receive the battery management system holder via a leading rail and to ensure a better hold of the cells (of the accumulator) within the power unit. Furthermore, the spacer/cell holder is a variable and preferably three-part spacer/cell holder. Preferably, three cylindrical battery cells/accumulator cells are used.

It is preferred if the protection circuit is provided and configured, in addition to the protection function, to exchange data with the application and/or the charging device via a one-wire connection.

It is advantageous if the jack plug or connector is provided and configured to transmit data and power.

In addition, it is preferred if the communication interface/the interface module is provided and configured to activate user-based settings, in particular such as a maximum rotational speed, a number of charging processes and/or data forwarding. It is advantageous if there is a three-pole socket in the interface module into which a device terminal of the application or of the medical instrument engages. In this way, the voltage connection as well as the ground and data line can be connected to the respective application. Within this, the connection can be made via a screw connector or a ribbon cable on the motherboard or the (accumulator-integral) control electronics, respectively.

It is advantageous if the housing module has a trapezoidal base, preferably with dimensions of 43×50 mm.

Preferably, the components of the power supply are provided and configured to be firmly connected to each other via the interface module with a device terminal of the medical instrument and to form a unit in which the battery management system/the second printed circuit board including battery management holder is located. It is preferred if the battery management system/the second printed circuit board has at least three balancing ICs. In this case, the voltage taps of the individual cell voltages, i.e. the voltages of the individual battery cells/accumulator cells, as well as the total voltage of the at least three cells forming the accumulator, are made in series via the square-angled connection points with low ohm through copper or aluminum arresters from the battery management system/the second printed circuit board.

A low-ohm connection is of great importance in particular for the sensor system, for example for the detection of the rotational speed as well as for the connection between power electronics of the accumulator or smart accumulator, which is found in the accumulator-integral control electronics, and the head of the medical instrument or of the electric motor in the medical instrument. The low-ohm connectivity to the device/application is achieved here via the rotating bayonet lock. The rotary mechanism can be mounted in the medical instrument by the power unit in the basic state with the help of the interface module.

It is preferred if the battery management system/the second printed circuit board is firmly screwed to the battery management system holder and if the interface module is pressed, glued and/or welded into a module housing of the accumulator pack module to form a self-contained accumulator block.

Thus, the units (accumulator block and device-terminal unit) can be connected to each other by a slight turning movement, e.g. clockwise. As soon as this has been done, the device terminal is firmly connected to the rest of the accumulator unit in an end position. In order to release the end position, at least one opposing spring force has to be applied to the device terminal. The locking can be reversed by a counterclockwise rotational movement of the connecting mechanism. The device terminal may be a control unit in the accumulator head or another unit in the energy platform equipped with an identical device terminal. The mechanism for disconnecting/connecting the units remains identical.

Furthermore, it is preferred if an authorized opening mechanism is provided by attaching a universal lock into the housing module, which is provided and configured by a bolt lock to prevent the rotation of the aforementioned opening mechanism.

Furthermore, it is advantageous if the bayonet lock is provided and configured to be protected against unauthorized opening by a mechanical coding on the rotary movement within the three bayonet slots. Alternatively, a mechatronic system is preferred, which initializes the above-mentioned closure mechanism, for example, via an RFID chip.

It is preferred if the housing material of the accumulator module is made of plastic, preferably V01. Alternatively, another housing material, such as aluminum, is conceivable.

Preferably, each cell holder is configured to receive the battery cells/accumulator cells, preferably three battery cells/accumulator cells, via a clamping engagement. For this purpose, it is advantageous that the cell holder has at least three clip modules that are rounded in such a way as to house the battery cells/accumulator cells.

It is advantageous if the battery management system holder is insertable via a leading rail/guide rail in the longitudinal direction of the battery cells/accumulator cells into a guiding groove which is provided on each cell holder/spacer.

In summary, the present disclosure relates to a smart accumulator, a medical instrument/application part comprising such a smart accumulator as well as a medical treatment system comprising such an instrument, a charging station and a display. The smart accumulator integrates the entire control electronics of/for the medical instrument/application part as well as a plurality of smart functions, in particular the charging state of the accumulator and/or the control of the accumulator-charging station. Using wireless data transfer, the operating parameters of an accumulator-powered drill can be displayed in the operating room. This increases the confidence in the device and makes the operation/application plannable. Any interruptions due to accumulator swaps or something similar can thus be avoided or performed at a suitable/plannable time.

As a final note, the preceding aspects of the present disclosure create the possibility of offering a type of accumulator set system consisting of a uniformly designed, universal accumulator pack module according to at least one of the preceding aspects and a plurality of individually designed device-terminal units, or units equipped with different smart functions, which have an identical closure and can thus be combined with the universal accumulator pack module as desired. This means that the entire accumulator block can be adapted to different medical instruments simply by swapping the device-terminal unit. This is fast and cost-effective.

BRIEF DESCRIPTION OF THE FIGURES

The disclosure is explained in more detail below by way of a preferred configuration example with reference to the accompanying figures.

FIG. 1 is a schematic representation of a smart accumulator and its structure according to the present disclosure;

FIG. 2 is a representation of the medical treatment system according to the present disclosure;

FIG. 6 is a top view of an interface module of the modular accumulator;

FIG. 7 is a cross-sectional view of the interface module of the modular accumulator;

FIG. 8 is a cross-sectional view in the longitudinal direction of the modular accumulator.

DESCRIPTION OF THE CONFIGURATION EXAMPLE

Figure 3:
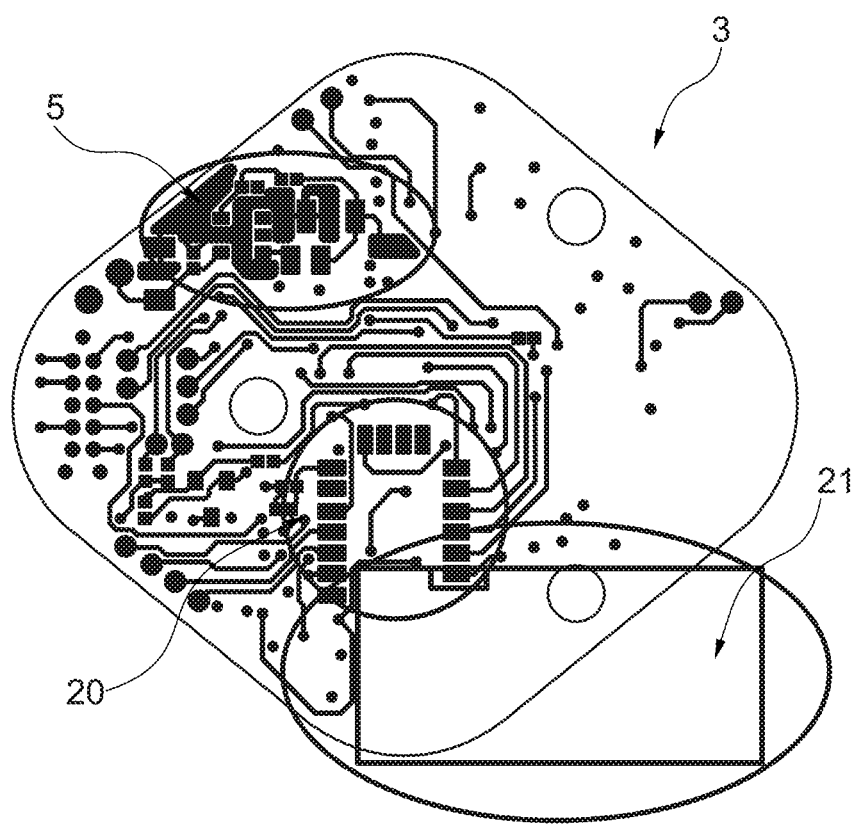
FIG. 3 is a representation of individual components arranged on a first printed circuit board in accordance with the present disclosure.

In the following, a configuration example of the present disclosure is described based on the accompanying figures. The figures are merely schematic in nature and serve to facilitate understanding of the invention. Identical elements are designated by the same reference signs.

FIG. 1 is a schematic representation of a smart accumulator 1 and its construction according to the present disclosure. The smart accumulator 1 is provided for a medical instrument/application part 2 (described in detail in FIG. 4) for electric power supply of an instrument-internal electric equipment, preferably to drive an electric motor (not shown). The smart accumulator 1 comprises accumulator-integral control electronics 5, which are arranged on a first printed circuit board 3 and which are provided for driving the entire electric equipment.

The smart accumulator 1 comprises an accumulator 9, which may be formed by one or more power storage cells, and at least a first printed circuit board 3 and a second printed circuit board 4, as well as an accumulator head 15.

The accumulator head 15 is located at the top end of the smart accumulator 1 or at the top side of the accumulator 9 or at the individual power storage cells 9 bundled to form a battery pack. The top ends of the accumulator 9 or of the individual power storage cells 9 are housed or inserted in the accumulator head 15. Corresponding receiving openings are therefore configured in the accumulator head 15.

Furthermore, the accumulator head 15 has a cable shaft 17, which is a bushing or hole for feeding cables 16 or a portion of the cables 16 into the accumulator head 15 for electrical connection to the accumulator 9.

The cables 16 are each connected at one end to the positive or negative pole of the accumulator 9 and electrically connected at the respective other end to the first printed circuit board 3, or the cables 16 are each electrically connected at one end to the first printed circuit board 3 and at the other end to the second printed circuit board 4. The electrical connection points can be soldered or plugged in or something similar.

According to FIG. 1, the first printed circuit board 3 has fixing means 18, which are provided for fixing the first printed circuit board 3 to the accumulator 9. On the first printed circuit board 3, the communication interface 6, configured as a Bluetooth device 20, is shown, which is provided for wireless data transfer to an external interface 8. The second printed circuit board 4 in FIG. 1 shows a protection circuit of the smart accumulator 1 and is attached to the side of the accumulator 9. The first and second printed circuit boards 3 and 4 may be glued/plugged or otherwise fixed to the accumulator 9.

FIG. 2 is a representation of the medical treatment system 14 according to the present disclosure. FIG. 2 shows the instrument/application part 2 with the smart accumulator 1, which is insertable therein, a display device 8, and a charging station or charging device 12. The smart accumulator 1, the display device 8, and the charging station 12 communicate with each other via preferably Bluetooth and can thus wirelessly exchange data with each other. Alternatively, communication via WLAN or radio is also conceivable.

The display device 8 is provided and configured to visually display data, parameters or other required information, in particular the charging state. In FIG. 2, the display device 8 shows an electrical monitor and has a communication interface compatible with the communication interface 6 of the smart accumulator 1.

Figure 4:
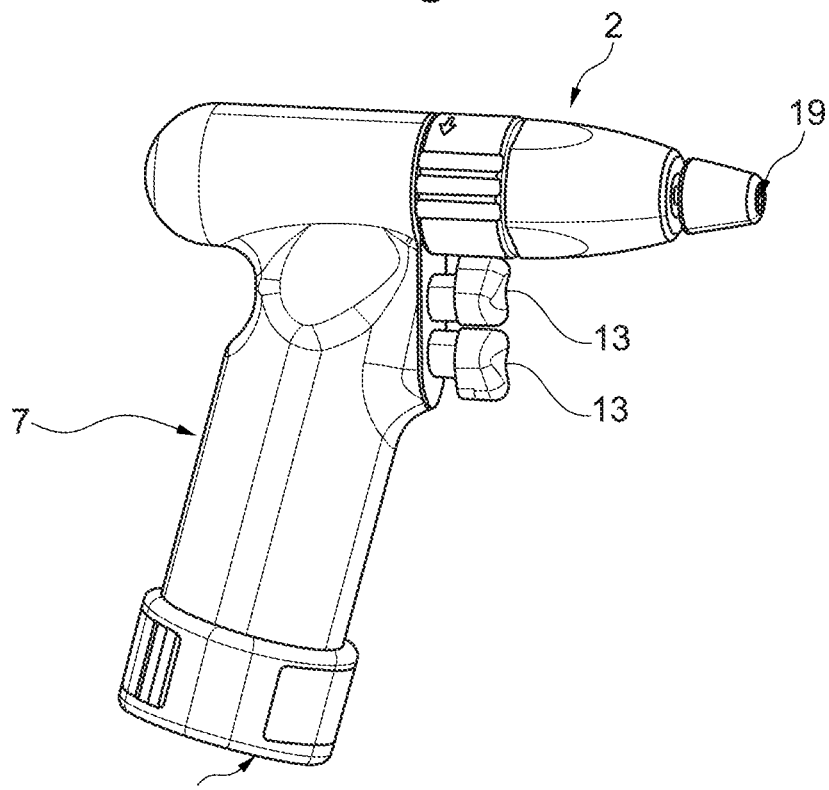
FIG. 4 is a representation of the structure of the medical instrument according to the present disclosure.

The medical instrument/application part 2 has a receiving compartment 7 configured and provided to receive the smart accumulator 1 (described in more detail in FIG. 4).

The charging station 12 serves to receive the smart accumulator 1 removed from the receiving compartment 7. The charging station 12 is informed by wire of the accumulator type of the accumulator 9 when the smart accumulator 1 is inserted and is then configured to charge the accumulator 9 with the correct charge curve. This means that the charging station 12 adopts the charge curve. Therefore, the smart accumulator 1 does not have charging intelligence. The charging station 12 is also configured to visually display the charging state itself. The charging station 12 also has a communication interface compatible with the communication interface 6 of the smart accumulator 1 and that of the display device 8.

FIG. 3 is a representation of a first printed circuit board 3 with the electrical components and/or sensors arranged thereon according to the present disclosure. The first printed circuit board 3 preferably has the shape of the bottom side 10 of the accumulator 9. At least the control electronics 5 or the switching regulator, a Bluetooth device 20 and an antenna blocking area 21, which is preferably not grounded, are located on the first printed circuit board 3. In addition, the printed circuit board 3 is equipped and connected with further electrical components that are not described in more detail in FIG. 3.

FIG. 4 is a representation of the structure of the medical instrument/application part 2 according to the present disclosure. The medical instrument/application part 2 shows the receiving compartment 7 formed in a handle part of the instrument 2 and in which the smart accumulator 1 is integrated, a lid 11 arranged at the lower end of the handle part and enclosing the smart accumulator 1, at least two operating keys/buttons 13 for operating the instrument/application part 2 by the user, and a tool-receiving device 19 configured to receive various attachments such as drills, burs, etc.

Furthermore, an electric motor is integrated into the instrument/application part 2 and this is supplied with power and driven via the plugged-in smart accumulator 1. It is preferred that the receiving compartment 7 is made of titanium and the lid 11 is made of plastic. This enables sterilization of the receiving compartment 7 and of the lid 11 as well as wireless data exchange via the lid 11.

Figure 5:
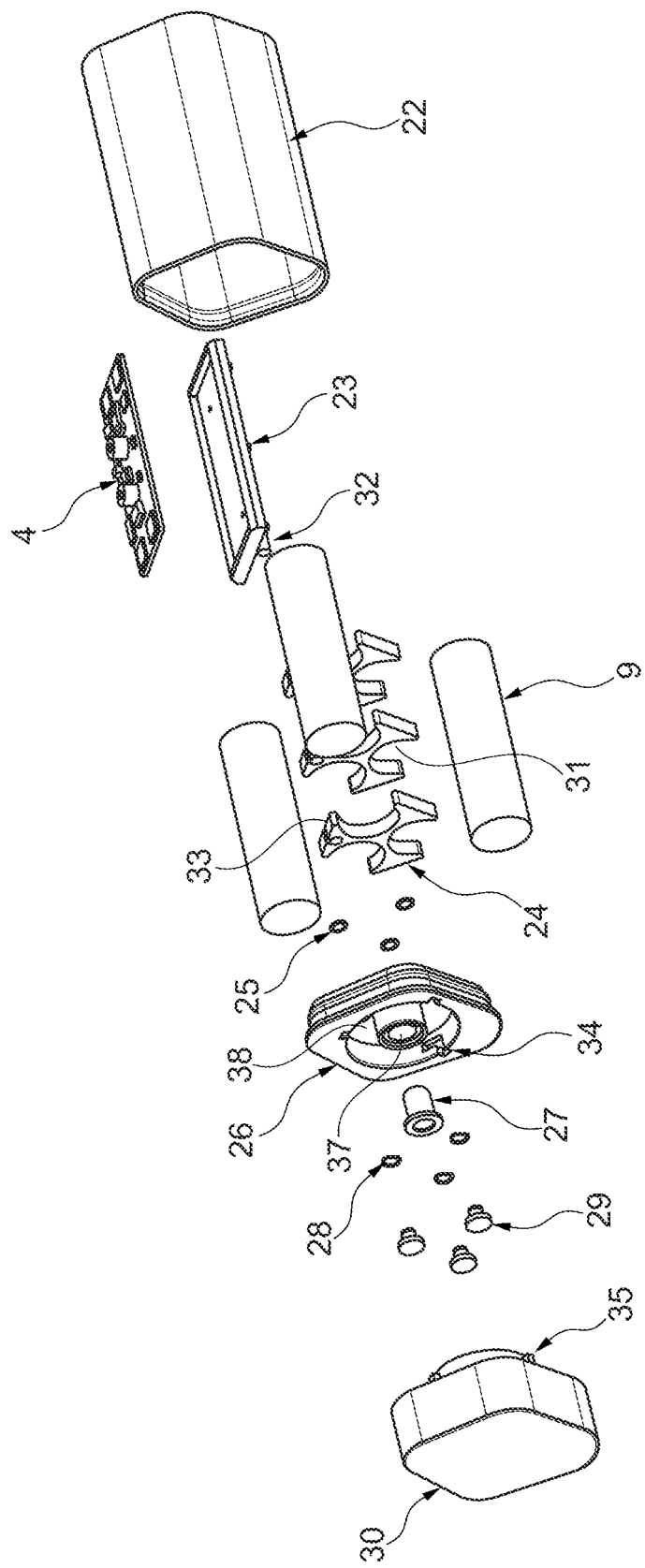
FIG. 5 is an exploded view of the modular accumulator.

FIG. 5 is an exploded view of the modular smart accumulator consisting of a device-terminal unit and an accumulator pack module. The accumulator pack module has a module housing 22, which is preferably configured in the shape of a trapezoid and is provided to house the following components. A printed circuit board holder/battery management system holder 23 is preferably configured in the form of the second printed circuit board 4 such as to receive the second printed circuit board 4 in a fixing, preferably screw-fixing, manner or, respectively, to fix the second printed circuit board 4 to the printed circuit board holder 23 such that the second printed circuit board 4 is positionally fixed in the printed circuit board holder 23. In addition, three cell holders 24 are preferably provided, each having three circular recesses 31, each of which is open to one side to the extent that a battery cell/accumulator cell 9 can be received in each recess 31 in a lamping manner. It is preferred if the three cell holders 24 are evenly spaced along the length of the battery cells/accumulator cells 9.

The cell holders 24 each have a conductor groove/guide groove 33 on one side, i.e. between two recesses 31 of a cell holder 24. The conductor groove/guide groove 33 of each cell holder 24 is oriented in such a way as to receive a conductor rail/guide rail 32 inserted in the longitudinal direction in a sliding manner. Preferably, both the conductor groove/guide groove 33 and the conductor rail/guide rail 32 are configured to be round. The conductor rail/guide rail 32 is arranged centrally on the bottom side of the printed circuit board holder 23 in the longitudinal direction. In this way, it is possible to attach the printed circuit board holder 23 with the second printed circuit board/battery management system 4 attached to it to the cell holders 24 and thus to the accumulator cells/battery cells 9.

These composite components comprising printed circuit board holder 23, second printed circuit board 4, at least three cell holders 24 and three battery cells/accumulator cells 9 as well as a first printed circuit board 3 (not shown), are configured to be inserted into the module housing 22.

Furthermore, an interface module 26 is shown in FIG. 5, which is also configured in a trapezoidal shape in order to be received by the module housing 22. The interface module 26 is configured to be inserted, preferably pressed, onto or into the module housing 22 like a plug. The interface module 26 has a correspondingly projecting rim, which has the same circumference and the same form as the circumference of the module housing 22 and therefore overlaps with the module housing 22. Furthermore, the interface module 26 preferably has a centrally arranged circular sleeve receptacle 37 configured to receive therein a sleeve 27 for inserting a communication bus or a data cable, respectively, preferably a plug connection of the data cable or of the communication bus, respectively. The plug connection preferably protrudes from the sleeve 27 in the direction towards the device-terminal unit 30 to such an extent that, when the bayonet lock is closed, the plug connection is automatically connected to the device-terminal unit 30 in such a way as to transmit data and power.

In addition, three holes 36 (shown in FIG. 6) are provided in the interface module 26, which are arranged in a ring-shaped indentation 38 around the circular sleeve receptacle 37. The interface module 26 is shown in a top view in FIG. 6 and in a cross-sectional view in FIG. 7. Based on FIGS. 6 and 7, the arrangement can be better understood.

The three holes 36 are provided to receive contacting pins 29 therein. A wave spring washer 28 is provided between each contacting pin 29 and the interface module 26. On the side of the interface module 26 opposite the wave spring washer 28 in the direction towards the accumulator cells/battery cells 9, the inserted contacting pins 29 are fixed/secured with a snap ring 25. Each inserted contacting pin 29 is in electrical connection with a respective battery cell/accumulator cell 9 and enables a voltage supply of the device terminal unit 30. Centrally within the indentation 38 the circular sleeve receptacle 37 is provided, which is configured to receive the sleeve 27 preferably in plug form. Furthermore, the interface module 26 has snap-in guides 34 at the upper rim of the ring-shaped indentation 38. The snap-in guides 34 in which a snap-in nose 35 engages are preferably configured in an L-shape.

Figure 9:
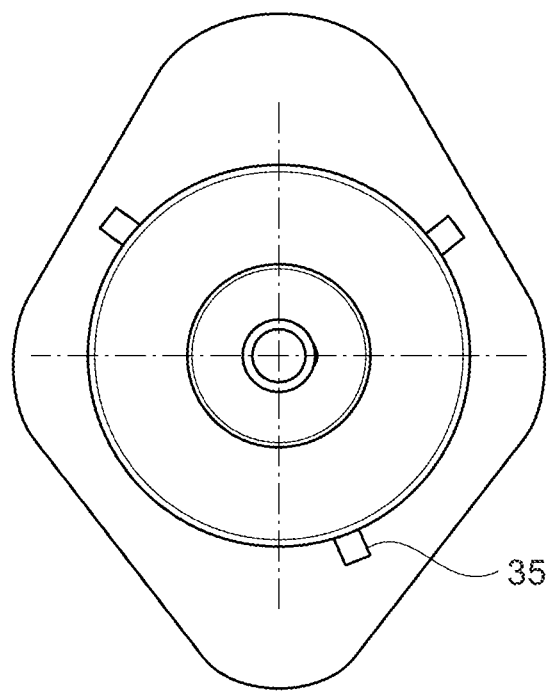
FIG. 9 is a top view of the device terminal of the modular accumulator.

The snap-in noses 35 are attached to a device-terminal unit 30 and are configured to fix the device terminal 30 to the interface module 26 in a snap-fit/rotational manner. Furthermore, the device-terminal unit 30 has an elevation which engages with a precise fit in the circular indentation 38 of the interface module 26. The device-terminal unit 30 is lid-shaped and has the same shape as the module housing 22. This can be seen better in the top view of the device-terminal unit as shown in FIG. 9.

FIG. 8 shows a cross-section in the longitudinal direction of the accumulator module. Here, it can be seen that the device-terminal unit 30 has a ring-shaped elevation in the center, which is received in the indentation 38 of the interface module 26 and in this way makes contact with the contacting pins 29 located in the holes 36, which are each fixed to or respectively in the interface module 26 via a snap ring 25.

LIST OF REFERENCE SIGNS

1 smart accumulator
2 instrument/application part
3 first printed circuit board
4 second printed circuit board
5 control electronics
6 communication interface
7 receiving compartment
8 display device
9 accumulator
10 bottom side
11 lid
12 charging station/device
13 first and second actuation button
14 treatment system
15 accumulator head
16 cable/lines
17 cable shaft
18 fixation points
19 tool-receiving device
20 bluetooth device
21 barrier region of the antenna
22 housing module
23 printed circuit board holder
24 cell holder
25 snap ring
26 interface module
27 sleeve
28 wave spring washer
29 contacting pin
30 device-terminal unit
31 recess
32 conductor rail
33 conductor groove
34 snap-in guide
35 snap-in nose
36 holes
37 sleeve receptacle
38 ring-shaped indentation

The invention claimed is:

1. A smart accumulator for a medical instrument for the electrical power supply of an instrument-internal electric equipment, the smart accumulator comprising:

one or more accumulator cells,
accumulator-integral control electronics configured to drive the instrument-internal electric equipment,
a plurality of smart functions including an associated sensor system, and
an integrated intelligence at least consisting of a protection circuit, a motor regulation as well as a wireless communication interface, wherein the wireless communication interface is arranged on a first circuit board fixed to an end of the smart accumulator,
wherein the end is arranged at a cover of the medical instrument enclosing the smart accumulator in a receiving compartment of the medical instrument, and
wherein the wireless communication interface is configured to transmit data through the cover.

2. The smart accumulator according to claim 1, wherein the smart functions concern at least one of the following functions:
a charging state of the one or more accumulator cells,
a temperature of the accumulator and/or the instrument,
a rotational speed of an instrument motor,
a current consumption of the electric equipment,
a voltage
an output power of the instrument motor, and/or
an activation detection to detect an installation state in the instrument and to activate the electronic components from a power saving sleep mode.

3. The smart accumulator according to claim 1, wherein the medical instrument comprises a handle part with the receiving compartment for actuating the medical instrument and the smart accumulator is provided and configured to be insertable and/or pluggable into the receiving compartment.

4. The smart accumulator according to claim 1, wherein the smart accumulator has a data memory which is provided and configured to store a load history and/or to transmit a load history to a display device in order to determine and/or to detect a remaining service life of the respective accumulator and/or an operating behavior and/or occurring faults based on the transmitted data.

5. The smart accumulator according to claim 1, wherein the wireless communication interface comprises an antenna for communication to an outside of the receiving compartment.

6. The smart accumulator according to claim 1, wherein the wireless communication interface is a radio transmission according to the Bluetooth Low Energy standard in 2.4 GHz band.

7. The smart accumulator according to claim 1, wherein the smart accumulator is provided and configured to communicate a type of the accumulator to a charging station when plugged in for setting an accumulator-specific charge curve, wherein the charging station is provided and configured to regulate charging of the accumulator.

8. The smart accumulator according to claim 1, wherein the integrated intelligence is provided and configured to recognize a direction of rotation wherein the direction of rotation can be changed/reversed by simultaneously pressing and holding a second key and/or the smart accumulator is provided and configured to automatically set the accumulator-integral control electronics into a power-saving sleep mode upon removal from the receiving compartment.

9. The smart accumulator according to claim 1, wherein the smart functions are arranged in a device-terminal unit which is releasably couplable to an accumulator pack module via a mechanical-electrical coupling mechanism, wherein the accumulator pack module comprises at least the accumulator-integral control electronics, the one or more accumulator cells, and the protection circuit.

10. The smart accumulator according to claim 9, wherein the device-terminal unit and the accumulator pack module are connectable via a bayonet lock.

11. A medical instrument of the hand-held instrument type, with a smart accumulator according to claim 1.

12. A medical treatment system comprising a medical instrument according to claim 11, an accumulator-charging station, and a display device.

13. The smart accumulator according to claim 1, wherein the cover comprises plastic.

14. The smart accumulator according to claim 1, wherein the instrument comprises materials that allow complete sterilization and/or reprocessing, wherein the cover comprises a different material than an application part of the medical instrument, wherein an exterior surface of the application part of the medical instrument comprises titanium and the cover comprises plastic.

15. The smart accumulator according to claim 3, wherein the smart accumulator is removable from the receiving compartment of the medical instrument prior to a sterilization of the medical instrument, such that the medical instrument can undergo sterilization without the smart accumulator being inside the receiving compartment.

* * * * *